United States Patent
Imai (10) Patent No.: US 7,324,866 B2
(45) Date of Patent: Jan. 29, 2008

(54) METHOD FOR MANUFACTURING SEMICONDUCTOR DEVICE

(75) Inventor: Shinichi Imai, Hirakata (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 101 days.

(21) Appl. No.: 11/305,074

(22) Filed: Dec. 19, 2005

(65) Prior Publication Data
US 2006/0161288 A1    Jul. 20, 2006

(30) Foreign Application Priority Data
Jan. 18, 2005    (JP) .............................. 2005-010154

(51) Int. Cl.
G06F 19/00    (2006.01)
(52) U.S. Cl. .................. 700/121; 700/31; 700/105; 438/14
(58) Field of Classification Search ............ 700/31, 700/105, 109, 121; 438/4
See application file for complete search history.

(56) References Cited

U.S. PATENT DOCUMENTS
2007/0026541 A1 * 2/2007 Kokura .................. 438/7

FOREIGN PATENT DOCUMENTS
JP    2002009059    1/2002

* cited by examiner

*Primary Examiner*—Leo Picard
*Assistant Examiner*—Sheela Rao
(74) *Attorney, Agent, or Firm*—Stevens, Davis, Miller & Mosher, LLP (57) ABSTRACT

A method for manufacturing a semiconductor device is provided in which it is possible to perform process control taking account of wafer information and to deal with the process control in which a recipe is change from one wafer to another. The method comprises steps of inserting a process control system into the path of a network where a manufacturing execution system (MES) and a manufacturing apparatus are connected with each other by using a LAN, obtaining a process result on the lot of the wafers at a previous step through the use of the process control system to rewrite the process recipe, and transmitting the rewritten process recipe from the process control system to the manufacturing apparatus. Since the method includes the step of obtaining the process result on the lot effected at the previous step as wafer information, it is possible to calculate a control parameter taking account of the state of the wafers. Also, since a process control (APC) system is inserted between the MES and the apparatus, there is no communication between the MES and the APC system, so that a communication burden is reduced, thereby the process control can be performed from one wafer to another.

1 Claim, 11 Drawing Sheets

METHOD FOR MANUFACTURING SEMICONDUCTOR DEVICE

BACKGROUND OF THE INVENTION

1. Field of the Invention

The present invention relates to a method for manufacturing a semiconductor device which involves a process control technique used in a process for particularly manufacturing a semiconductor device.

2. Background Art

Conventional process control techniques are often used based on sensor-derived data such as gas pressure and RF power of the inside of an apparatus. Besides, process controls are often performed in lots. That is, processes are conducted in such a way that one recipe corresponds to one lot. Take a gate etching process for instance. The etching is performed by changing the contents of a recipe into an optimum setting parameter value based on the sensor values of an etching apparatus. When there is a deviation in a gas pressure, the etching is performed after adjusting the value of the gas pressure. As a result, it is possible to perform the etching taking account of a change in the state of the reaction chamber of the etching apparatus (for example, JP-A No. 2002-9059).

Besides, since methods of manufacturing a semiconductor device are practiced by combining numerous process steps, all the steps including the management of lots are generally subjected to centralized management by a manufacturing execution system (MES). In such manufacturing methods, when a lot is fed to an apparatus, the apparatus inquires a process recipe of the MES. Then the MES transmits a recipe number corresponding to the lot to the apparatus. At this point of time, to change the recipe in response to the state of the reaction chamber as described above, a method is generally practiced in which the MES inquires of its associated system a process control method before the transmission of the recipe from the MES to the apparatus to transmit the result of the inquiry to the apparatus.

In conventional process control techniques, since the manufacturing execution system (MES) inquires of its associated system the process control method, a problem has arisen in that it is difficult to use a manufacturing method in which the process control is performed from one wafer to another. Also, another problem has arisen in that such a conventional system cannot handle process control which covers consecutive process steps, that is, process control which is performed based on a result effected at the next previous process step.

SUMMARY OF THE INVENTION

An object of the present invention is to provide a method for manufacturing a semiconductor device which allows a process control taking account of wafer information to be performed and which is capable of dealing with the process control in which a recipe is changed from one wafer to another.

To attain such an object, a method for manufacturing semiconductor device according to a first aspect of the invention is provided as a method for manufacturing a semiconductor device in which a process recipe is transmitted from a manufacturing execution system to a manufacturing apparatus to conduct processing on a lot of semiconductor devices. The method for manufacturing a semiconductor device according to the first aspect includes steps of inserting a process control system into the pass of a network where the manufacturing execution system and the manufacturing apparatus are connected with each other by using a LAN, acquiring a process result on the lot at a previous step by using the process control system to rewrite the process recipe base on the process result, and transmitting the rewritten process recipe from the process control system to the manufacturing apparatus.

According to such a configuration, unlike the conventional process techniques, the process control system does not belong to the manufacturing execution system (MES) and hence, the process control system is able to execute the process control independently. Because of this, it becomes possible to eliminate a time period during which the MES inquires a process control method of the process control system. Besides, since the step of acquiring a process result on a lot effected at the previous step as wafer information is included, it is possible to calculate a control parameter taking account of the states of wafers, thereby the process control can be performed from one wafer to another.

A method for manufacturing a semiconductor device according to a second aspect of the invention corresponds to the manufacturing method according to the first aspect in which a step of checking the state of the manufacturing apparatus through the use of the process control system is included and in which when the state of the manufacturing apparatus has been determined as being normal, the process recipe can be rewritten.

According to such a configuration, when the manufacturing apparatus is in an abnormal state, an optimum process control cannot be performed with a value calculated by the process control system, which allows the process control system to operate to restrict the rewrite of the process recipe.

Methods for manufacturing a semiconductor device according to third and fourth aspects of the invention correspond to the manufacturing method according to the first or second aspect which includes steps of calculating a control parameter value in advance based on a process result on a lot at the previous step through the use of the process control system and of rewriting the control recipe with the control parameter value.

Methods for manufacturing a semiconductor device according to fifth and sixth aspects of the invention correspond to the manufacturing method according to the third or fourth aspect which includes steps of transmitting data from an inspection apparatus, which inspects a lot processed at the previous step, to the process control system and of calculating the control parameter value in advance based on data at the process control system.

According to such a configuration, it is possible to handle even a lot of semiconductor device manufactured at faster than normal speed. That is, although there are cases where data on a lot is not yet sent when the process control system obtains a process result on the lot effected at a previous step from the database, processing on the lot can be performed by directly transmitting its data from the inspection apparatus to the process control system.

Methods for manufacturing a semiconductor device according to seventh to tenth aspects of the invention correspond to the method of manufacturing a semiconductor device according to the third, fourth, fifth, or sixth aspect of the invention which comprises steps of storing the process recipe rewritten through the use of the control parameter value, obtaining an inspection result on the processed lot, and updating the control parameter value from the inspection result.

According to this configuration, it is possible to update the control parameter value at all times. Because of this, process

DESCRIPTION OF THE EXEMPLARY EMBODIMENTS

Figure 1:
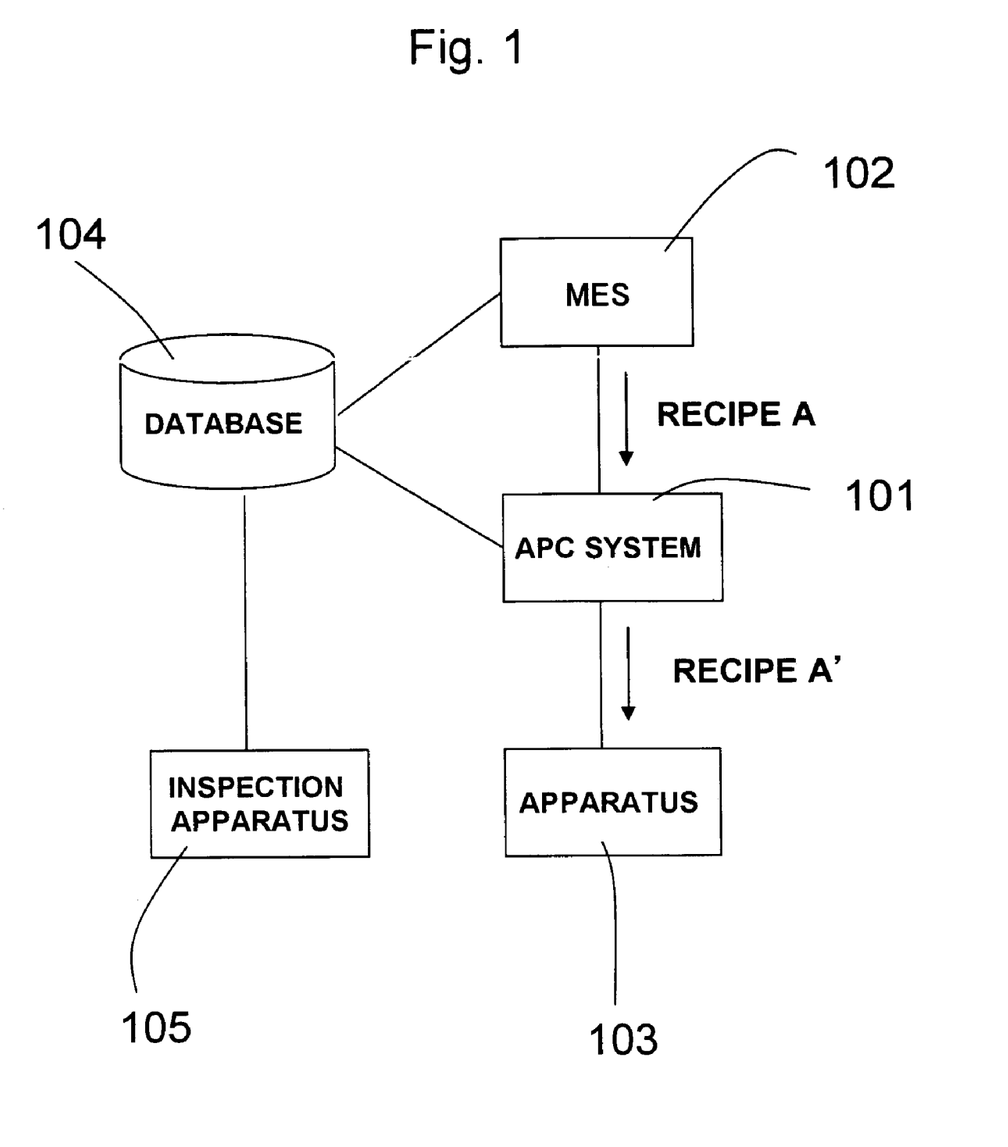
FIG. 1 a drawing for explaining the system configuration of a method for manufacturing a semiconductor device according to a first embodiment of the present invention.

A first embodiment according to the present invention will be described with reference to FIGS. 1 to 4. FIG. 1 is a drawing for explaining a system configuration which includes an APC (advanced process control) system used in the first embodiment of the invention.

As shown in FIG. 1, to transmit a process recipe from a manufacturing execution system 102 to a manufacturing apparatus 103 to conduct processing on a lot of semiconductor devices, a method for manufacturing a semiconductor device according to the first embodiment of the invention includes steps of inserting a process control system 101 into the path of a network where the manufacturing execution system 102 and the manufacturing apparatus 103 are connected with each other by a LAN, acquiring a process result on the lot at a previous step by using the process control system 101 to rewrite the process recipe, and transmitting the rewritten process recipe from the process control system 101 to the manufacturing apparatus 103.

Through its insertion between the MES 102 and the apparatus 103, the APC system 101 is able to directly receive a recipe A transmitted from the MES 102 to the apparatus 103. Because of this, the APC system 101 plays a role in transmitting to the apparatus 103 a recipe A' having changed to a desired value. Over here, two important things will be described below. The one thing is that it is possible to insert the APC system 101 into any system in which there is no need to install the APC system 101 in the MES 102 and in which the MES 102 and the apparatus 103 are on-line connected with each other. Generally, an additional system (subsystem) is often installed in the MES 102 and hence, an interface is designed to construct a system. However, in this embodiment of the invention, there is an advantage in that there is no need to design an interface between the MES 102 and the APC system 101. And the other thing is that since the APC system 101 directly receives the recipe from the MES 102, such an arrangement is very suitable to handle individual wafers. The manufacturing apparatus capable of handling 300-mm-dia wafers is provided with on-line specifications in which the parameter of the recipe can be changed from one wafer to another (specifications in which the apparatus and the MES are connected with each other by using communications). However, when the parameter value is changed actually from one wafer to another, it is necessary for the MES 102 to inquire of the APC system 101 the amount of a change in the parameter from one wafer to another, so that it takes much time to conduct the communications. At worst, the process comes into a standstill because the apparatus 103 waits for the recipe obtained as the numeric value calculated by the APC system 101. As a consequence, a problem has arisen in that the availability factor of the apparatus 103 decreases.

In the system configuration according to the first embodiment of the invention, since the APC system 101 is able to independently deal with the process recipe irrespective of the presence of the MES 102, it is possible to promptly deal with the individual wafers. In this case, the APC system 101 is able to access a database 104 which has accumulated results measured by an inspection apparatus 105 at a previous step, thereby given process data can be obtained. Besides, since the exchange of the data between the MES 102 and the apparatus 103 is carried out via the APC system 101, the APC system 101 is also able to obtain information shared by the MES 102 and the apparatus 103 such as lot numbers and wafer numbers.

Figure 2:
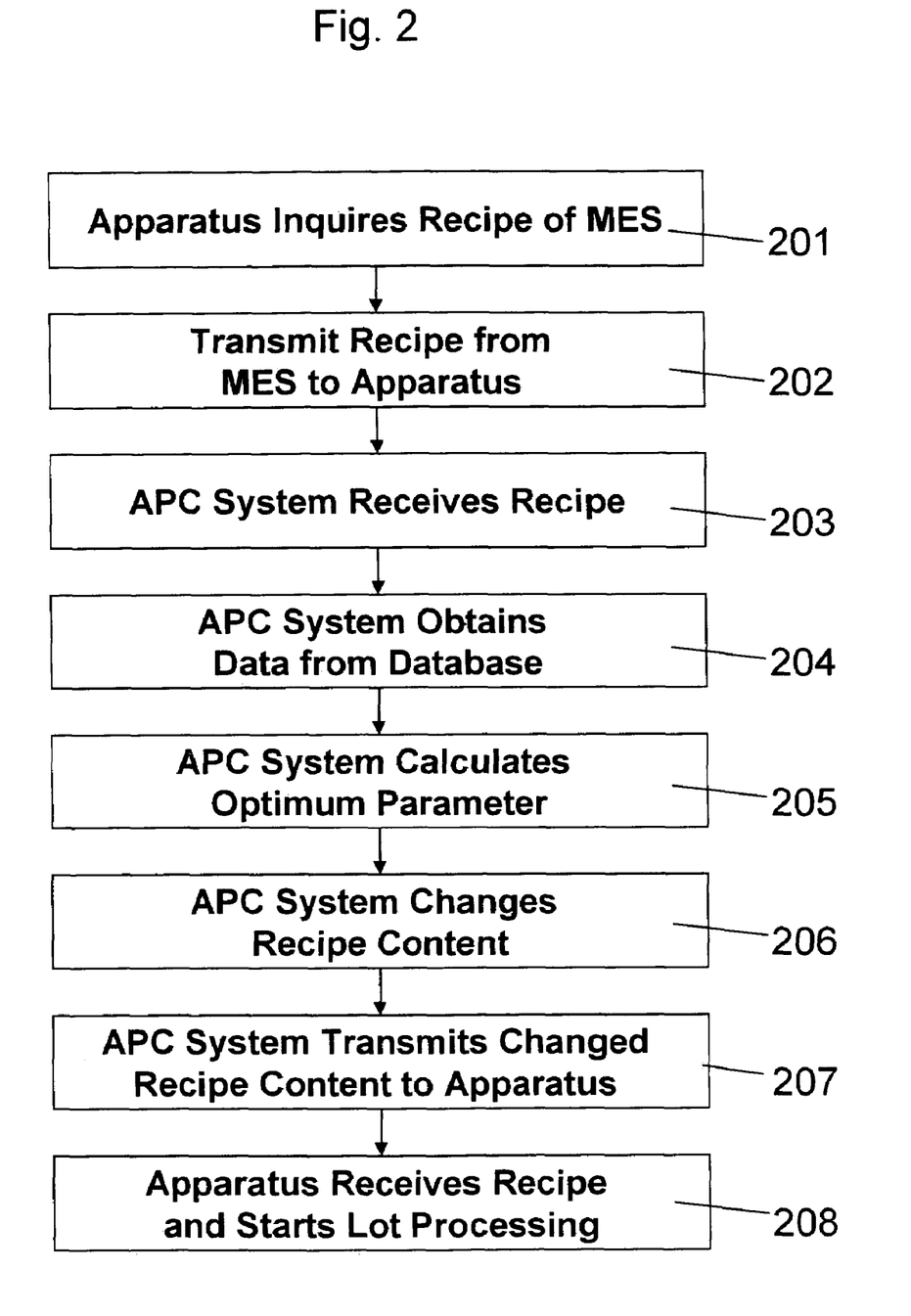
FIG. 2 is a flowchart of the first embodiment.

FIG. 2 is a flowchart of the first embodiment of the invention.

As shown in FIG. 2, when a given lot has initially reached the apparatus 103, the apparatus 103 or its associated lot recognition unit reads a lot number or a wafer number, and then the apparatus 103 inquires of the MES 102 a recipe or a recipe number used for lot processing via the APC system 101 (Steps 201 to 203). At this time, the APC system 101 recognizes from the lot number and the wafer number that the lot is a lot to be subjected to the APC.

Then the APC system 101 obtains process data on the lot at the previous process step from the database 104 connected to the inspection apparatus 105 (Step 204) and calculates a control parameter value through the use of an algorithm programmed within the system in advance so as to become a processing target value at this process step (Step 205).

And then, the APC system 101 changes the recipe content having sent from the MES 102 (Step 206) and transmits the changed recipe content to the apparatus 103 (Step 207). Thereafter, the apparatus 103 conducts the lot processing based on the recipe content rewritten by the APC system 101 (Step 208).

Figure 3A:
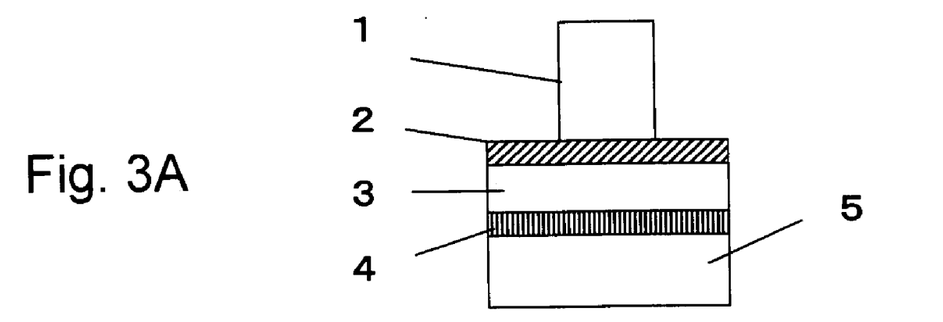
FIGS. 3A to 3C are cross-sectional views of a semiconductor device manufactured in the first embodiment which are illustrated in the order of its process steps.
Figure 3B:
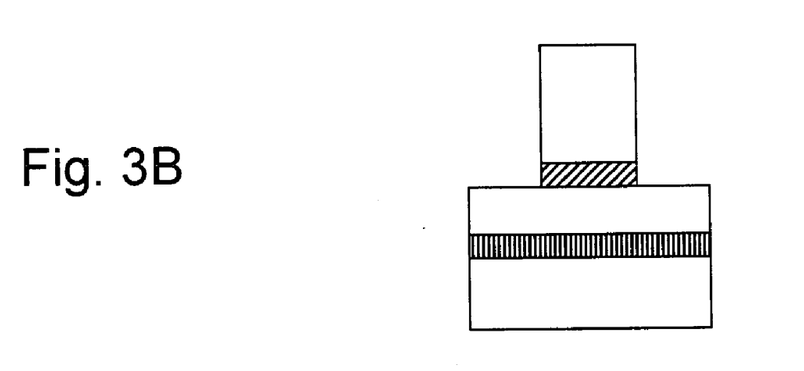
Figure 3C:
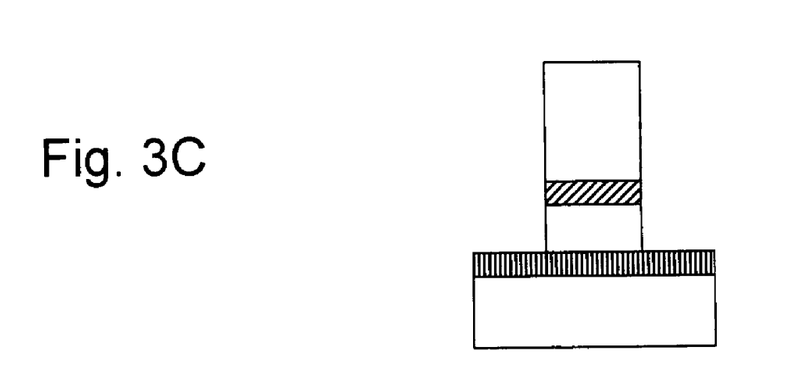

FIGS. 3A to 3C are cross-sectional views of a semiconductor device illustrated in the order of its process steps in a case where the first embodiment of the invention is applied to a step of forming a gate electrode. FIG. 3A is a lithography step, FIG. 3B is an ARC etching step, and FIG. 3C is a gate etching step. As shown in FIG. 3A, a gate oxide film 4, a polysilicon film 3, and an ARC film 2 are formed on a silicon substrate 5 in that order. And then, to form a gate pattern, etching is conducted by using a photoresist film 1 as a mask. In the gate electrode etching process, to reduce fluctuations in the dimension of the gate electrode and a deviation in the central value of its dimension, it is possible to make the central values of the dimension of the post-etching gate electrode approach their target value by changing a time period, a gas flow rate, a gas pressure, and a high-frequency power during the etching based on dimensional measurement data obtained after the lithography step. And at the same time, the fluctuations in its dimension can be also reduced. At this time, as shown in FIG. 3B, the resist or the organic film (ARC: anti-reflective coating) and the insulating film deposited on the electrode are etched at a step prior to the etching step for the electrode itself. A process control performed during the ARC etching will be described below.

Figure 4:
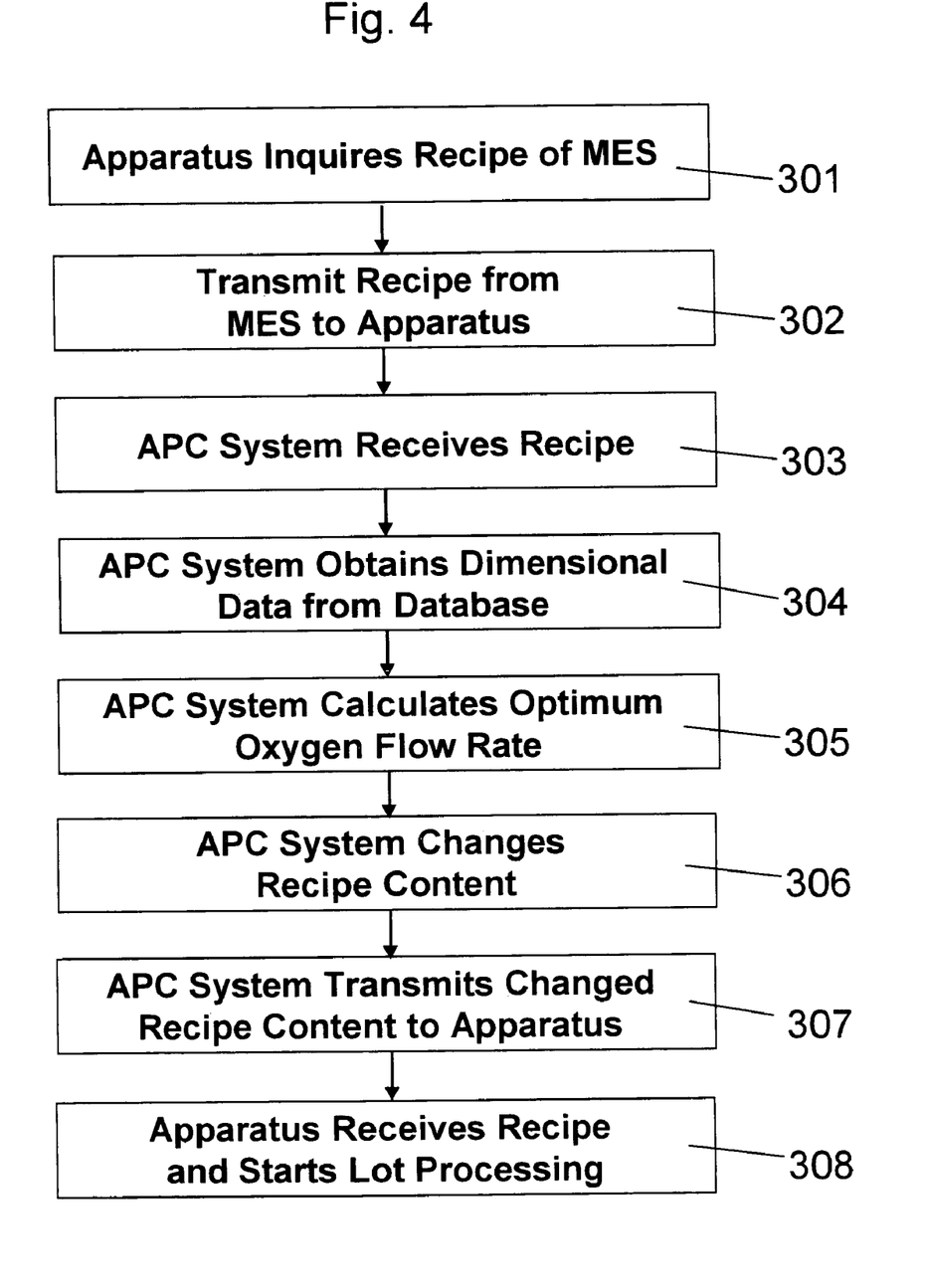
FIG. 4 is a flowchart of a step of forming a gate electrode according to the first embodiment.

FIG. 4 is a flowchart for explaining a case where the first embodiment of the invention is applied to the step of forming the gate electrode. As shown in FIG. 4, the MES 102 initially receives a recipe request from the apparatus 103 which conducts the etching (Step 301) and transmits to the apparatus 103 a given recipe or recipe number used for the lot processing (Step 302). At this time, the recipe or the recipe number having transmitted from the MES 102 is received by the APC system 101 (Step 303). The APC system 101 accesses the database 104, which stores the dimension of the gate pattern obtained after the lithography (a result measured by using a SEM-type measuring apparatus, an optical measuring apparatus, or the like), to obtain given dimension data (Step 304). Then the APC system 101 derives a parameter value from calibration data on a dimensional shift rate effected after the ARC etching to an etching parameter (FIG. 5) set in advance at the APC system 101 (Step 305).

Figure 5:
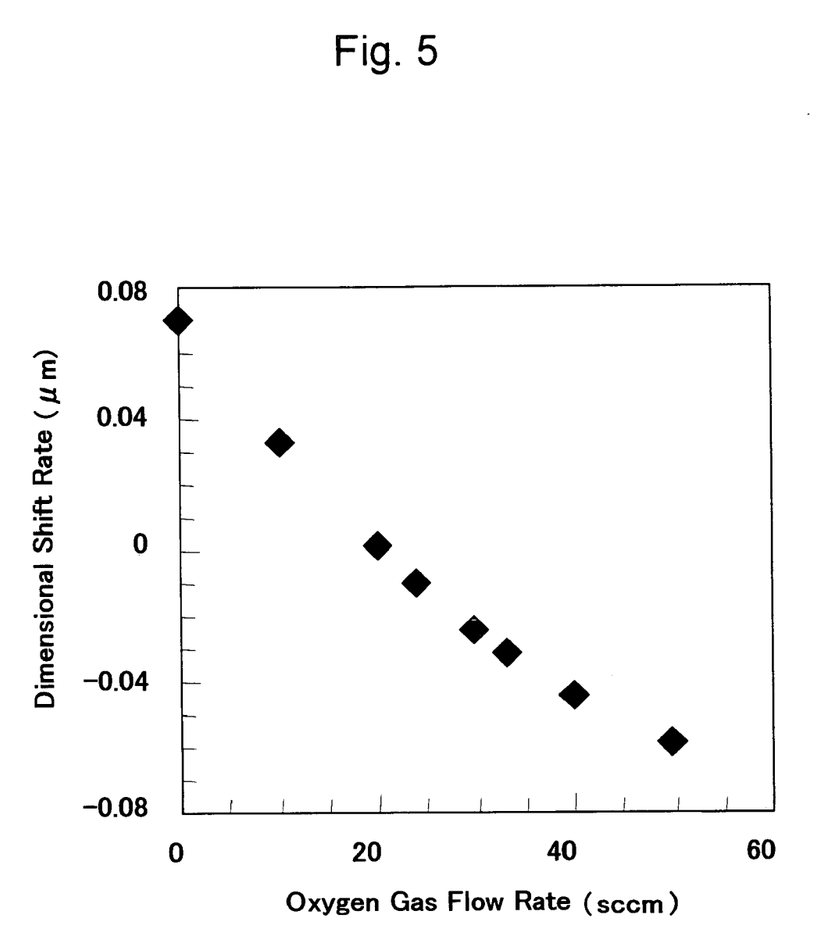
FIG. 5 is a graph for explaining calibration data.

FIG. 5 is a graph for explaining data on the dimensional shift which changes with respect to an oxygen flow rate. The dimensional shift indicated in FIG. 5 represents a numeric value obtained by subtracting the gate electrode dimension effected after the lithography from the gate electrode dimension effected after the ARC etching. Upon the data, the oxygen flow rate is increased to narrow the dimension of the gate electrode by etching when the dimension thereof effected after the lithography is larger than a predetermined value. When the dimension thereof effected after the lithography is smaller, the oxygen flow rate is decreased conversely. As described above, the APC system 101 changes the oxygen flow rate from a default value (Step 306) and transmits a changed recipe or recipe number to the apparatus 103 (Step 307). At this moment, when the recipe number is transmitted, plural recipes must be inputted to the apparatus 103 in advance in addition to the recipe for the default. A manufacturing apparatus capable of receiving a recipe itself such as a manufacturing apparatus for 300-mm-dia wafers is designed so as to transmit a recipe based on a changed parameter. Then the apparatus 103 performs processing on the lot through the use of the changed recipe or recipe number having sent from the APC system 101 (Step 308). Up to now, in the formation of the gate electrode of a semiconductor device with a line width of 0.18 μm, a fluctuation in the dimension of the electrode within a 3σ limit has been 0.026 μm. However, the application of the first embodiment of the invention to the formation has successfully reduced the fluctuation to 0.018 μm. Likewise, in the formation of the gate electrode of a semiconductor device with a line width of 0.13 μm, although a fluctuation in the dimension of the electrode within a 3σ limit has been heretofore 0.0159 μm, the application of the first embodiment of the invention to the formation has allowed the fluctuation to be reduced to 0.0084 μm.

In this embodiment, since a step (algorithm) of acquiring wafer information is included, it is possible to calculate control parameters taking account of the states of the wafers. Besides, since the process control (APC) system is inserted between the MES and the manufacturing apparatus, there is no direct communication between the MES and the APC system and hence, a communication burden is reduced, thereby process control can be performed from one wafer to another.

That is, as described above, in the method for manufacturing a semiconductor device in which the APC system according to the embodiment of the invention is used, it is possible to shorten the process time period by 50% when compared with manufacturing methods using conventional APC systems in which a MES inquires a process recipe of an APC system, receives its result, and then transmits a recipe number to a manufacturing apparatus. In the APC system according to the embodiment, a data extraction time from the database is 0.25 to 1.75 seconds and hence, each process control can be completed within 5 seconds initially targeted in the specification including the algorithm calculation. As a result, when the wafer to be processed has reached the process chamber before the APC usually determines the calculation result, the processing is stopped and hence, it is possible to solve the problem of affecting the production capacity of the apparatus.

A second embodiment of the invention will be described below with reference to FIGS. 6 and 7.

If the inventors dare to pose a problem on the first embodiment, there is a fact that the state of the manufacturing apparatus according to the first embodiment is not taken into account. That is, there is the problem that when a changed recipe content is transmitted to the apparatus in an abnormal state, an objective processing result cannot be obtained. When the state of the apparatus is abnormal, there is a difference in the preacquired calibration data shown in FIG. 5. Extremely speaking, when the state of the apparatus is abnormal, an optimum process control cannot be performed with the value calculated by the APC system according to the first embodiment of the invention. In such a case, there is a need to restrict the operation of the APC system for the change of the recipe.

Figure 6:
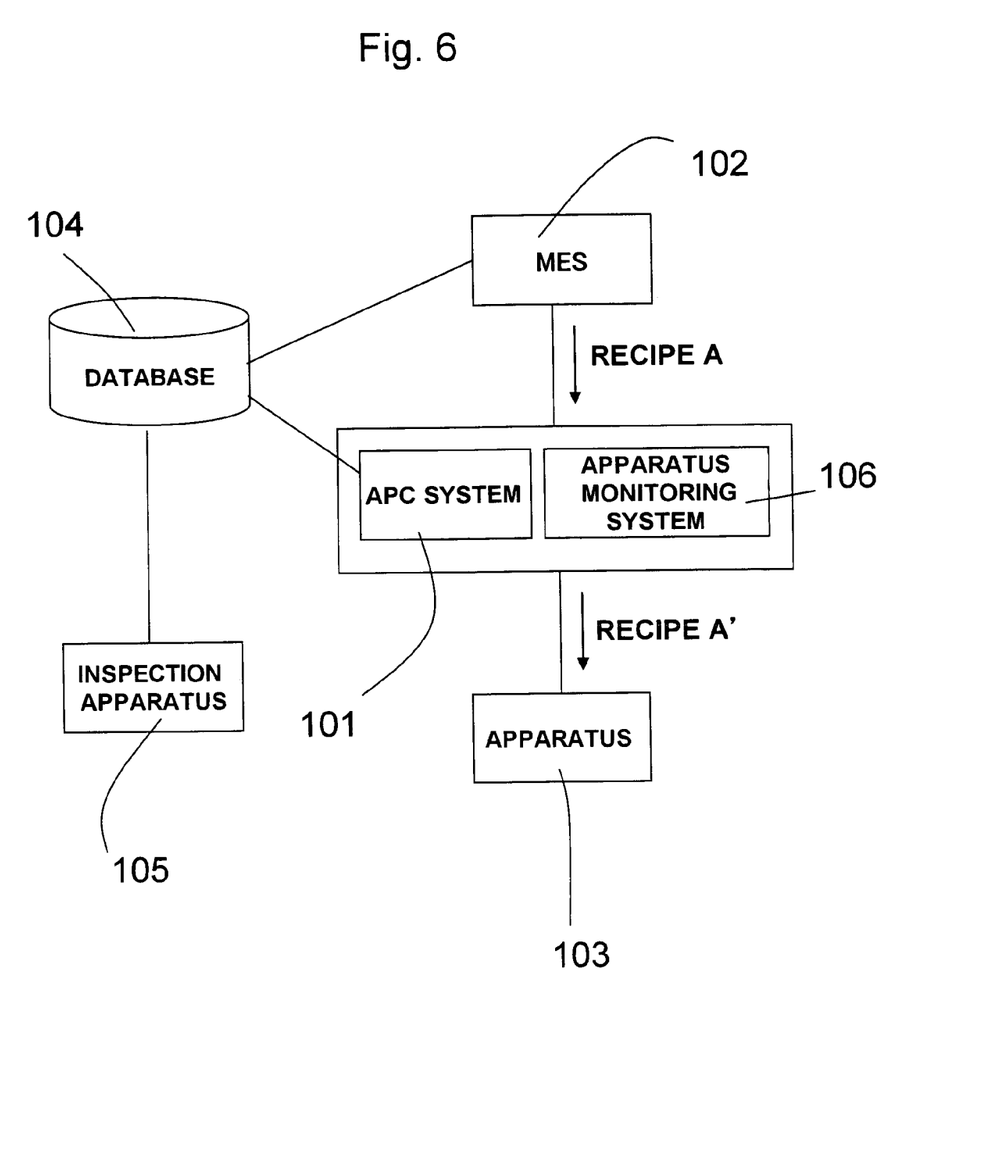
FIG. 6 is a drawing for explaining the system configuration of a method for manufacturing a semiconductor device according to a second embodiment of the invention.

FIG. 6 is a drawing for explaining a system configuration necessary for the second embodiment of the invention. Incidentally, the explanation of the same units as those described in the first embodiment will be omitted instead of giving the same reference numerals.

As shown in FIG. 6, the APC system 101 is inserted between the MES 102 and the manufacturing apparatus 103 as in the case of the first embodiment. By inserting the apparatus monitoring system 106 into the same position as that of the APC system 101 so as to co-reside with the system 101, the problem that the process control is performed without taking account of the state of the apparatus is solved. Also, since the two systems co-reside within the same hardware, a key feature of the second embodiment of the invention is that coordination between the two systems is effected very easily. That is, since the APC system 101 and the apparatus monitoring system 106 co-reside within the single hardware, not only is there a merit in that they function efficiently, but there is a big advantage in that the design of an interface between the systems can be practically omitted. And further, a more important thing is that a time during which the APC system 101 inquires of the apparatus monitoring system 106 about the state of each wafer can be omitted.

Over here, the function of the apparatus monitoring system 106 will be described. The apparatus monitoring system 106 monitors fluctuations in an apparatus parameter to determine whether the apparatus is in a normal state through the use of a statistical model (Mahalanobis' distance, T2, and DMODX) or an error band set therein. The apparatus monitoring system 106 transmits the result of the determination to the APC system 101 to tell the state of the apparatus constantly; or the APC system 101 inquires of the apparatus monitoring system 106 the state of the apparatus. As a result of this, the APC system 101 is able to know the state of the apparatus. In the APC of gate etching, at least the traveling wave and reflected wave of a high-frequency power, a gas pressure, and a plasma emission rate are monitored as well as an oxygen gas flow rate as apparatus monitoring parameters. In particular, by using the plasma emission (OES: optical emission spectroscopy) rate, the state of the chamber in which the etching process is conducted is monitored. In this case, the objects of the emission are oxygen, carbon, and fluorine and, for instance, their wavelengths are 555 nm, 516 nm, and 704 nm respectively.

Figure 7:
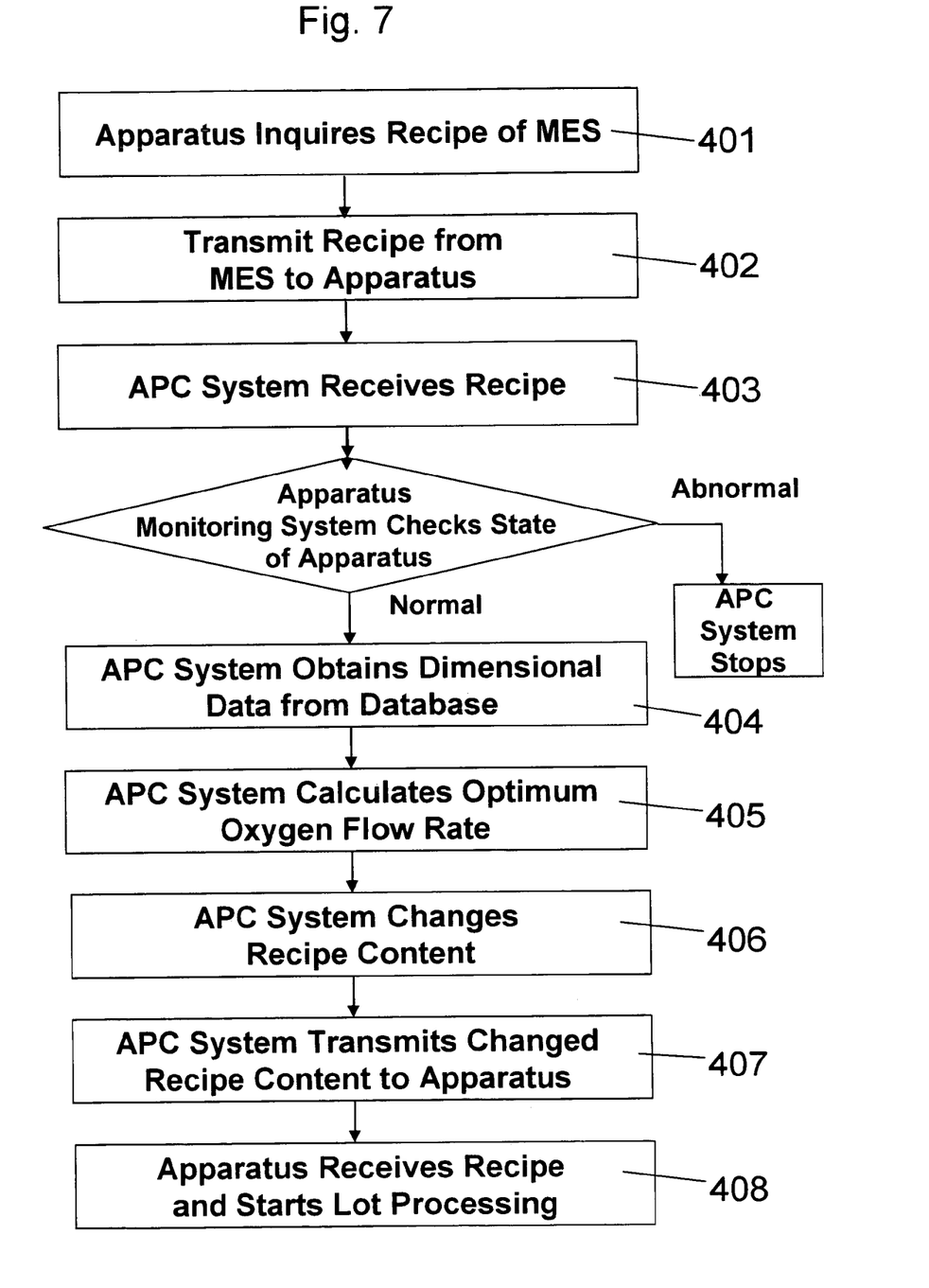
FIG. 7 is a flowchart of the second embodiment.

FIG. 7 is a flowchart of the second embodiment of the invention.

As shown in FIG. 7, when a given lot has initially reached the manufacturing apparatus 103, the apparatus 103 or its associated lot recognition device reads a lot number or a wafer number, and then the apparatus 103 inquires of the MES 102 a recipe or a recipe number for lot processing via the APC system 101 (Step 401). At this time, the APC system 101 recognizes from the lot number or the wafer number that the lot is a lot or wafers to be subjected to the APC. Then the MES 102 transmits a predetermined recipe or recipe number to the apparatus (Step 402). During this time period, the APC system 101 obtains data on the state of the apparatus from the apparatus monitoring system 106 (Step 403). At this point of time, by using data results whose parameter values fall within the error band or using a comprehensive Cp (process capability) value which is the square root of the sum of squares of the Cp values of the individual parameters, whether the apparatus is in a normal state is determined (Step 404). When the state of the apparatus is determined to be normal, progress to the next step is made. The subsequent flow including the next step (Steps 405 to 409) is the same as that described in the first embodiment of the invention (Steps 304 to 308). When the state of the apparatus is abnormal, the calculation performed at the APC system 101 is ceased to bring the apparatus into a standstill.

A third embodiment of the invention will be described below with reference to FIGS. 8 and 9.

When semiconductor devices have been manufactured according to the first and second embodiments of the invention, no problems have been encountered in the regular lot processing. However, in the manufacture of semiconductors, there are ranks in lot processing, that is, there are lots whose processing proceeds at normal speed and lots whose processing proceeds at faster than the normal speed. The latter lots are called rushing lots, and in the rushing lot processing, a problem has been encountered in that when the APC system obtains a process result on the lot at the next previous step from the database, data on the lot is not present. It has been newly found that such a problem occurs because the lot proceeds to the next step, i.e., the process control step before the data on the lot is stored in the database.

Therefore, in the third embodiment of the invention, when a rushing lot is dealt with, data on the lot is directly transmitted from an apparatus used at the next previous step to the APC system.

Figure 8:
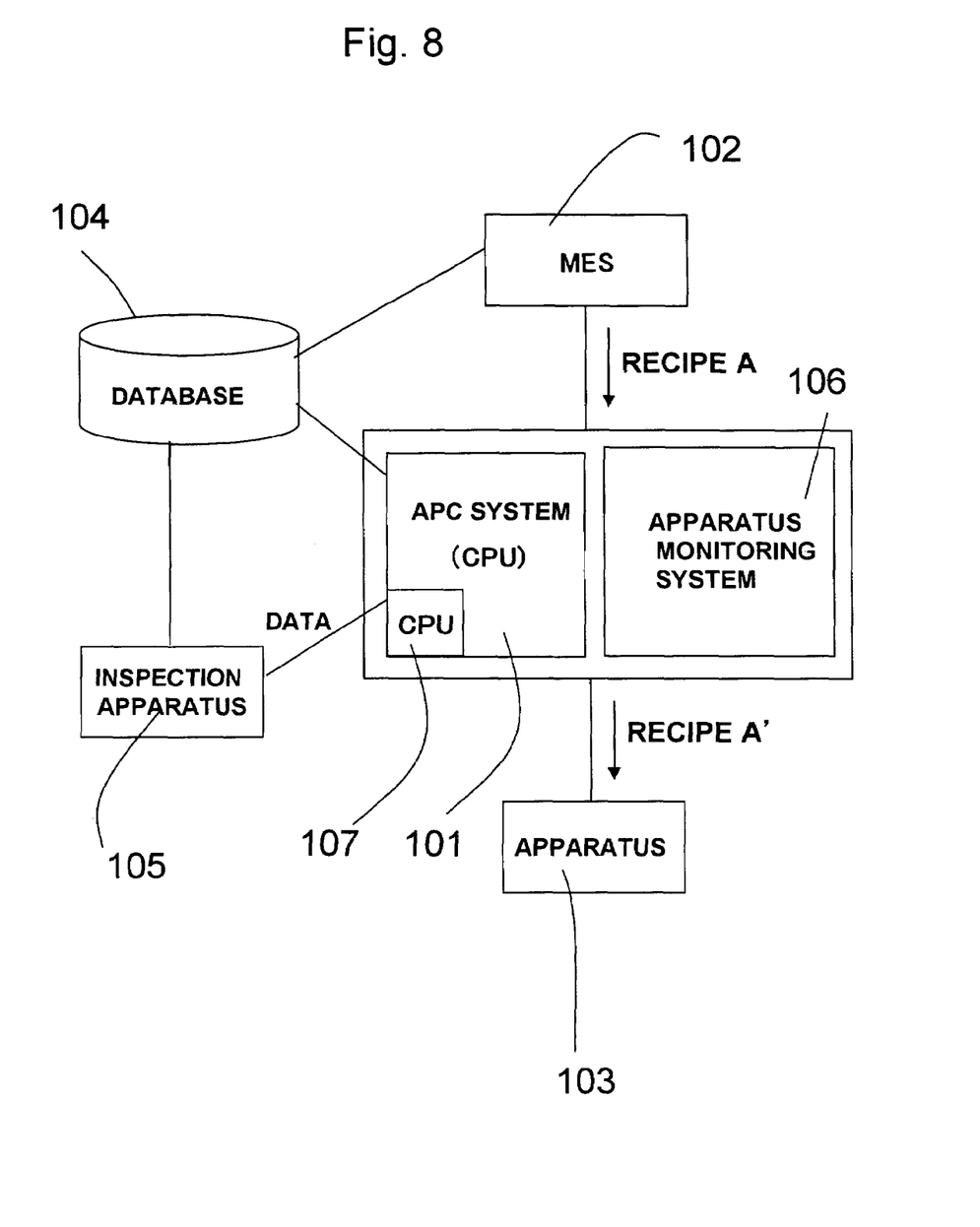
FIG. 8 is a drawing for explaining the system configuration of a method for manufacturing a semiconductor device according to a third embodiment of the invention.

FIG. 8 is a drawing for explaining a system configuration used in the third embodiment of the invention. Incidentally, the explanation of the same units as those used in the embodiment described above will be omitted instead of giving the same reference numerals.

As shown in FIG. 8, the APC system 101 is inserted between the MES 102 and the manufacturing apparatus 103 as in the case of the first and second embodiments. The third embodiment is different from the first and second embodiments in that it is possible to directly receive data from the apparatus used at the previous step, in particular, the inspection apparatus 105. In this embodiment, so as to be able to receive the data from the inspection apparatus 105 whenever necessary, the APC system 101 is provided with a CPU 107 other than CPUs (central processor units) which perform the process control. That is, the CPU 107 allows the inspection data used for rushing lot processing to be dealt with without any time lag while the APC system 101 performs the process control.

Figure 9:
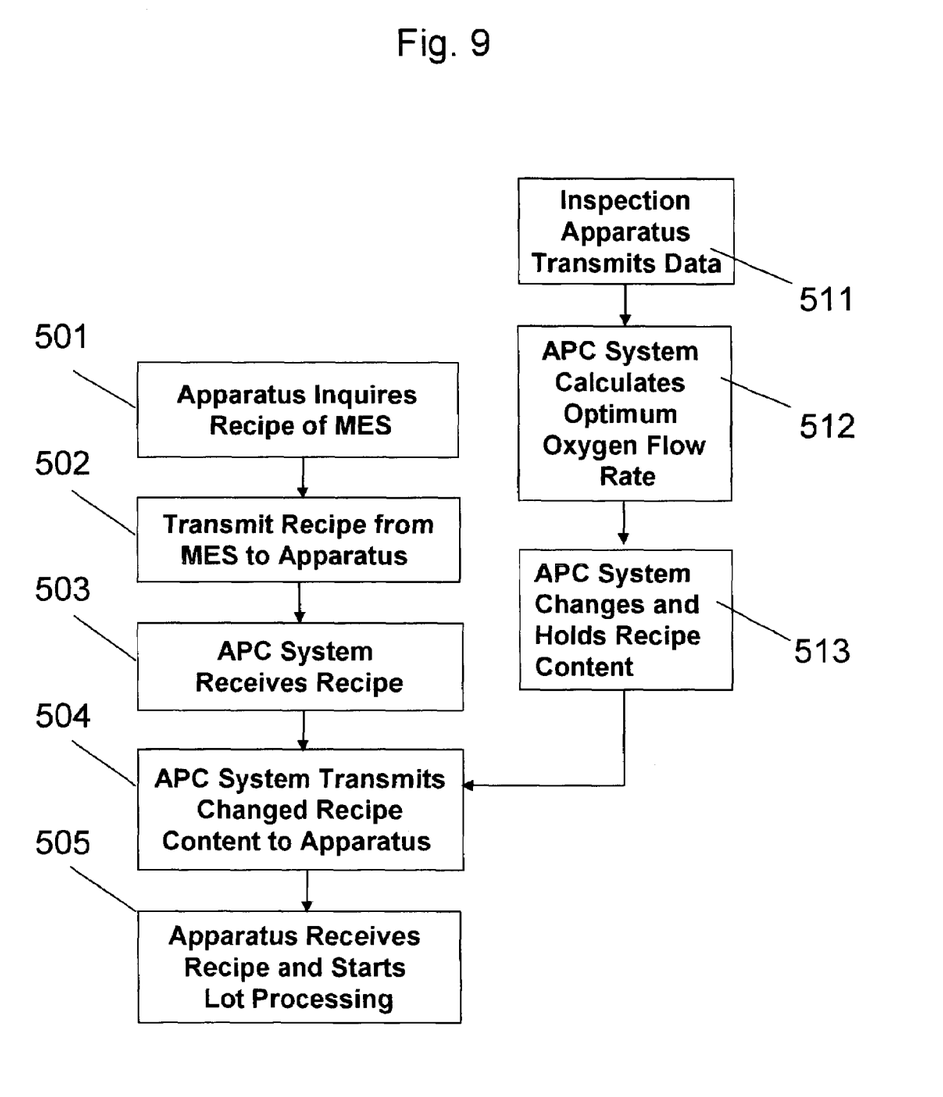
FIG. 9 is a flowchart of the third embodiment.

FIG. 9 is a flowchart for explaining the third embodiment of the invention.

As shown in FIG. 9, in, for instance, dimension control performed at the gate electrode process step, a dimension measurement result obtained after the lithography step is not only transmitted from the SEM-type or optical measuring apparatus (inspection apparatus) 105 to the data base 104 which stores the measurement result (Step 511) but also concurrently and directory transmitted to the APC system 101 (Step 501 and 502). And then, the APC system 101 obtains the dimension data whenever necessary (Step 503). As a consequence, the APC system 101 recognizes a dimensional result on a rushing lot and then calculates optimum parameters based on the algorithm (Step 512). The calculation result is temporarily stored within the APC system 101; however, to send the result to the MES 102, the result can be also transmitted from the APC system 101 to the MES 102. And then, when the given rushing lot reaches the apparatus 103, the apparatus 103 transmits the number of the lot and makes a request of the MES 102 for a recipe or a recipe number, following which the MES 102 transmits a predetermined recipe or recipe number. When the recipe or the recipe number passes through the APC system 101, the recipe is changed into a value calculated in advance or the recipe number is changed (Step 513), and then the changed recipe content is sent to the apparatus 103 (Step 504). Thereafter, the apparatus 103 conducts processing on the lot based on the sent recipe (Step 505).

In this way, the APC system according to the invention has been able to handle rushing lots as well.

A fourth embodiment of the invention will be described below with reference to FIGS. 10 and 11.

The fourth embodiment of the invention is intended to deal with fluctuations in calibration data caused during the production of semiconductor devices or to deal with the manufacture of semiconductor devices without calibration data. The calibration curve shown in FIG. 5 is one obtained at a certain time, and the data may fluctuate due to a fluctuation in the state of the apparatus. To perform process control with high precision, calibration data is very important and therefore, there is a necessity to update calibration data at all times. However, to update calibration data, there is a problem of entailing labor (time and money) for reacquiring the data changed by intentionally changing the parameters. Also, it is generally well known that a dimensional shift rate given at the etching step is changed by the open area ratio of a semiconductor device (the ratio of an etching area to a wafer area given at the etching step). That is, since photoresist patterns vary depending on the types of semiconductor devices, open area ratios vary as a matter of course. In the first to third embodiments of the invention, a high-precision process control can be performed on a single type of semiconductor devices, while a problem has arisen in that the process control of various types of semiconductor devices causes a fluctuation in the precision of the control. However, in the process control of various types of semiconductor devices, such a problem can be solved by acquiring calibration data using an open area rate changed in advance, that is, by providing various calibration data.

In the fourth embodiment of the invention, the APC system is provided with a self-learning function.

Figure 10:
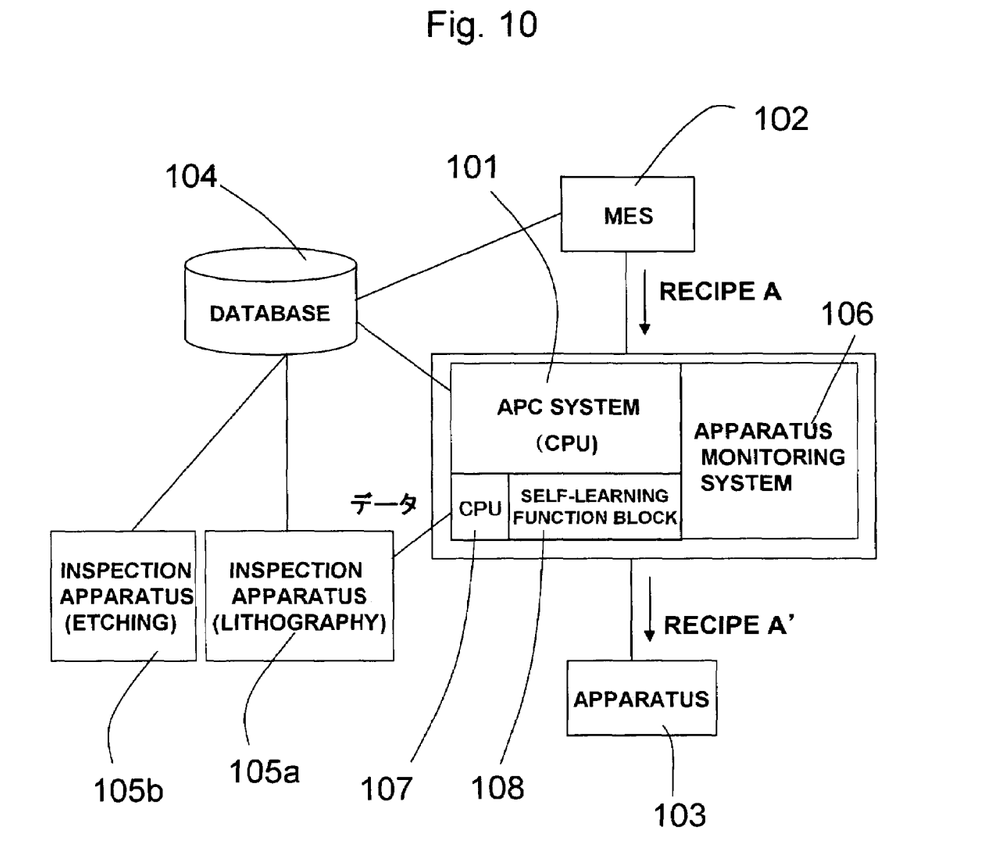
FIG. 10 is a drawing for explaining the system configuration of a method for manufacturing a semiconductor device according to a fourth embodiment of the invention.

FIG. 10 is a drawing for explaining a system configuration according to the fourth embodiment of the invention. Incidentally, the explanation of the same units as those shown in the embodiment described above will be omitted instead of giving the same reference numerals.

As shown in FIG. 10, a function block, which acts as a self-learning function, is provided within the APC system 101 (Step 108). This block has functions of collecting data from an inspection apparatus 105b provided at the process control step based on data from an inspection apparatus 105a provided at the next previous step, holding the data, and updating the calibration data based on various data. Incidentally, in the system according to the fourth invention, it is possible to hold the calibration data in plural forms. The holding is done to check and control the fluctuations in the calibration data and to properly use the individual calibration data to various types of semiconductor devices with different open area rates.

Figure 11:
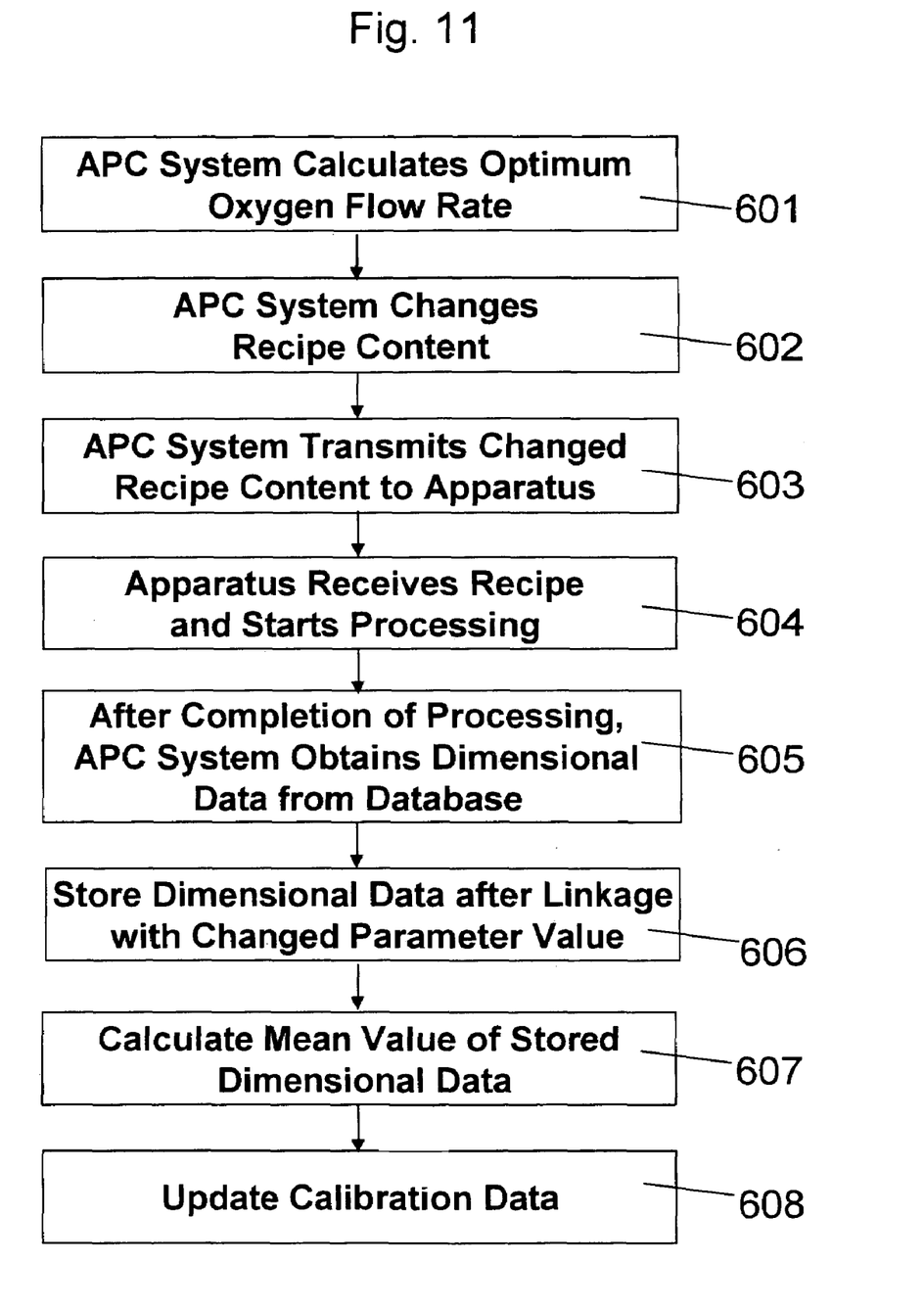
FIG. 11 is a flowchart of the fourth embodiment.

FIG. 11 is a flowchart for explaining a case where the fourth embodiment of the invention is applied to a step of forming a gate electrode.

As shown in FIG. 11, an optimum parameter (oxygen flow rate) is calculated at an etching step based on a dimensional measurement result obtained after a lithography step (Step 601) and the etching parameter is changed to subject a wafer to processing (Step 602 to 604). Then the process-controlled wafer proceeds to the next gate dimension measuring step. The dimensional data of the wafer measured by the inspection apparatus 105b at the measuring step is stored in the database 104 (Step 605). In general, the dimensional data is often stored in a database which stores dimensional data obtained after the lithography (there is no problem in storing the data measured by the inspection apparatus 105b in another database). The APC system 101 accesses the database 104 to obtain the dimensional data as an effect obtained after the process control. The dimensional data is linked with the changed process parameters and is held in the system (Step 606). By repeating such an operation, the dimensional data of plural wafers are obtained. A value to be updated is determined from the mean value of these various dimensional data (Step 607) and the calibration data is updated at preset periods (Step 608). That is, by using such a method, the degree of accuracy in the process control can be increased while the APC system 101 learns by itself.

It has been found that the same self-learning function as that described above has a great effect even on a variation in the open area rates of various semiconductor devices. First, the process control is also performed on lots or wafers different in open area rates by using reference calibration data. As a result, data on the lots or wafers measured at the subsequent step is obtained and stored. At this point of time, it is important to store the data while linking the data with the open area rates. While the plural wafers are processed, calibration data is automatically prepared according to the individual open area rates. Extremely speaking, the calibration data on the defaults is automatically prepared even when the data is not true data. That is, even when calibration data, a model expression, and the like are not inputted by the self-learning function, it is possible to build up a usable APC system.

The invention claimed is:

1. A method for manufacturing a semiconductor device, wherein process recipes used in individual processes stored in a manufacturing execution system are transmitted to a manufacturing apparatus and a lot of semiconductor devices is then subjected to processing, the method comprising steps of:
    a) inserting a process control system into a path of a local area network on which the manufacturing execution system and the manufacturing apparatus are connected with each other;
    b) obtaining a pattern size required in a lithography process at the process control system;
    c) rewriting, in accordance with the obtained pattern size, a process recipe, transmitted by the manufacturing execution system, for an etching process that follows the lithography process; and
    d) transmitting the rewritten process recipe for the etching process from the process control system to the manufacturing apparatus after step (c), a value of an oxygen flow rate included in the process recipe being rewritten at step (c).

* * * * *